March 31, 1964   J. M. DE MARRE   3,126,601
FASTENER
Filed Aug. 19, 1963

INVENTOR.
JOHN M. DEMARRE
BY
Smith & Mattern
ATTORNEYS

United States Patent Office 3,126,601
Patented Mar. 31, 1964

3,126,601
FASTENER
John M. De Marre, 7940 Seward Park S., Seattle, Wash.
Filed Aug. 19, 1963, Ser. No. 302,895
11 Claims. (Cl. 24—87)

This invention relates to fasteners and more particularly to fasteners which hold together materials by piercing them.

The purpose of the invention is to provide a fastener having excellent holding power under varying loads as might be expected to occur when fastened garments and materials are worn by active persons or animals, improving upon a fastener illustrated and described in co-pending application Serial No. 114,859.

An object of this invention is to provide a piercing fastener having excellent holding power under varying loads which is extremely safe to manipulate and to wear because its piercing hooks travel in a controlled motion path. From an overlapping non-use position to an open position and then to a substantially overlapping in use position, the pivoting structure or arms carrying the piercing hooks follow a movement which assures the fastening pin can be stored, handled and used with a high degree of safety.

Additional objects of the invention are to provide a fastening pin which can be: made easily in its effective component parts; assembled very readily without special tools or additional self-contained fasteners; and moreover economically supplied in various sizes from small sizes for infants' garments to large sizes for horse blankets.

The purpose and object of this invention will be better understood as the description of the invention is read and the drawings are reviewed. In the drawings.

Figure 1:
FIGURE 1 shows an infant wearing diapers held in place with an embodiment of the fastener.

In FIGURE 1, a baby 20 is shown wearing diapers 21 held in place by using two fasteners 22, each of which is drawing together material 23 near overlapping edges of diaper 21. Where it is elected not to permanently secure such a fastener to a diaper, each end of such fastener 22 has a pair of pivoting arms 24 and 25 arranged to pivot approximately about the same axis. At the pivot axis the ends of the arms 24 and 25 comprise interlocking hinge-like hook legs 26, 27 offset at or less than an angle of 90 degrees with the extending shank 28 of the pivotal arms. Each leg 26, 27, after projecting out a distance is turned back over itself forming a tab 45, leaving a clearance slightly larger than its own thickness to receive the turned back tab 46 on the other leg. At the opposite end of the pivoting arms 24, 25, a rounded, reversed, tapered, curved hook 30, 31, terminating in a sharp point 32, 33, is provided with an adjacent recess to accommodate the hook of the opposite arms when the fastener 22 is assembled and not in use.

The controlled position of the arms 24, 25 are handled completely, when the fastener 22 is in a non-use position, by mounting the interlocking hinge-like hook legs 26, 27, of the pivoting arms 24, 25, within receiving end structure 34, 35, of the elongated, expandable connecting body 36 of the fastener 22. Such receiving end structure 34, 35, and the continuing control body portion 37 of each fastener 22 are preferably made of an elastomer, such as natural rubber, polyisoprene, polybutadiene, hypalon, polyurethane or silicone rubber, or made of plastics capable of recovering their initial configuration after reasonable distortion, such as nylon, teflon, vinyl, polyethylene or polypropylene, or some other similar material which should be non-toxic. The elastomer, preferably, should have a minimum tensile strength of 2500 p.s.i. and a hardness identified as "Shore A durometer 35±5" and also be free from obvious imperfections and foreign materials. The total and relative sizes will vary according to the requirements of particular fasteners, probably being minimized for infant garments and maximized for animal 47 blanket 48 applications.

Figure 3:
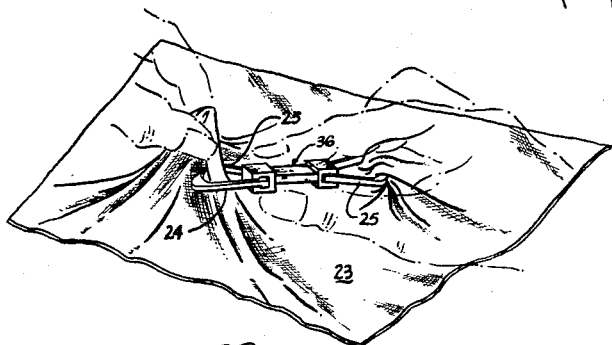
FIGURE 3 shows the fastener of FIGURE 1 being applied to a selected portion of material indicating the fingers of a person using the fastener.

The recess configuration 34, 35 to receive the pivoting arms 24, 25 is preferably made having a rectangular cross section closely conforming to the cross section of the overlapping hinge-like hook legs 26, 27 of the pivoting arms 24, 25. The width across each receiving structure 34, 35, including its recess or chamber 38, 39, is long enough to bear against each shank portion 28, 29, of respective pivot arms 24, 25, holding the shanks 28, 29 in a substantially parallel relationship when the fastener is unloaded and at rest. The central portion of the body 37, being a continuing control body portion 37, is necessarily reduced in size to provide the necessary required stretchability while maintaining the preferable holding power. The receiving structure ends 34, 35 of the fastener 22, however, are of larger cross section to accommodate the insertion of the hook-hinge ends 26, 27, and their immediate wall thicknesses 40 are large and strong enough to hold, effectively, not only the hinge-like hooks in place, but also the pivoting arms 24, 25, together with their hooks 30, 31, respectively, overlapped adjacent to one another in their "at rest" position. Also, the receiving ends 34, 35, and connecting body portion 37 resiliently act together to return the pivoting arms 24, 25 to such initial "at rest" position whenever the arms 24, 25 are separated by the insertion of material between their material receiving end hooks 32, 33, together forming a receiving V structure. There is always a returning force tending to nestle the pivoting arms 24, 25 together until the entry of materials forces the pivoting arms 24, 25 apart in preparation for piercing the material 23 with the hook points 32, 33, as illustrated in FIGURE 3. The sloping portions 41, 42, of each hook 30, 31, combining as they do to perform this material entering V, are further supplemented by the continuing curved shape of each piercing point 32, 33. Thereafter, when the resiliency of the fastener draws the hooks into the material, this same curved structure of each hook enhances the penetration of the hooks, yet the hooks may be quite easily removed by reversing the motion process intially used in setting the fastener in place.

The receiving structure 34, 35 encompassing the hinge like hook interlocking the legs 26, 27 of each pivoting arm 24, 25 closely approximates the composite size of these over interlocking leg ends 26, 27 so the arms 24, 25 are held securely together at all times, even when they are moved to their maximum deflected position. Also, the hinged interlocking hook leg portions 26, 27 are also protected by these surrounding resilient materials which form this receiving structure 34, 35, which is preferably arranged with the interior space 38, 39 being square or rectangular in configuration. The width of each hinge legs 26, 27 itself, on the pivoting arms 24, 25 is sufficiently wide so that substantial structure remains in an overlapped position during the entire opening and closing of the pivoting arms 24, 25. Coupled with the surrounding, restraining status of the resilient material in the receiving structure, 34, 35 there is no separation of the pivoting arms 24 and 25 at their hinge ends 26, 27 during normal usage of the fastener 22.

Such interfitting structure of the hinge hook leg ends 26, 27 and the surrounding receiving structure 34, 35 of the elongated, expandable body 36 permits the intial assembly without reliance on any tooling or additional fasteners being easily assembled by hand. One of the hinge legs 26 on a pivoting arm 24 is inserted through the recess 38 or 39, then passed beyond, thereafter interlocked with the hinged leg 27 of another pivoting arm 25 and the coupled legs 26, 27 are reinserted into the structural recess 38 or 39 of the body and aligned. If at any time the body 36 is overstressed, tearing away portions of the resilient materials, a piercing point 32, 33 is broken away, or a pivoting arm 24, 25 is otherwise damaged, reassembly of the fastener 22, using a replacement part, is again readily accomplished by hand without reliance upon special tooling or other self-contained fasteners. This improvement is noted when this fastener is compared with the fastener shown in application Serial No. 114,859, wherein a pivotable fastener is employed at the common axis of the pivoting arms.

Figure 4:
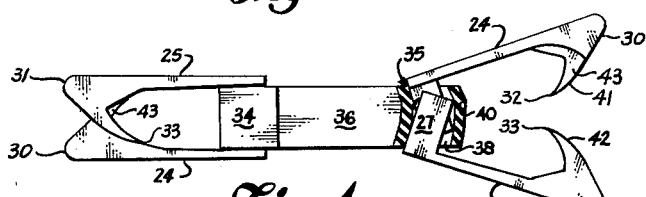
FIGURE 4 shows an assembled fastener of FIGURE 1, having the pivotal arms closed at one end and opened at the other end.

FIGURE 4 illustrates the fastener wherein the left side of the figure shows the pivoting arms 24, 25 in their "at rest" position in contrast to the right side of the figure where the pivoting arms 24, 25 are shown separated prior to piercing materials 23. Portions are shown broken away in FIGURE 4 to indicate how the resistive distortion forces in the receiving structure 34, 35 are created to return the arms 24, 25 and their hooks 30, 31 to their nestled position when external separating forces are removed.

In relationship to the "at rest" condition, the arms 24, 25 essentially have their same shank portions 28, 29 in a parallel relationship and their piercing points are overlapping and interfitting with the recess 43 or 44 on each adjacent respective arm 24 or 25.

In their overlapping relationship the hook ends 30, 31 present a material receiving structure so material 23 can be inserted conveniently. Their leading portions 45, 46 are rounded off to protect the user during installation and the baby, child, person or animal during wearing periods.

Figure 5:
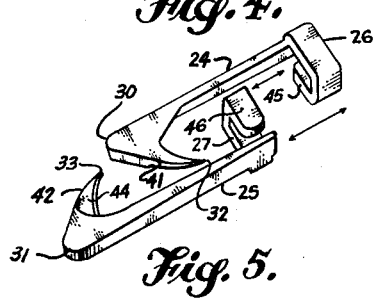
FIGURE 5 shows a pair of arms separated prior to their installation within the end receiving portion of the body structure.

In FIGURE 5, a pair of arms 24, 25 are spaced apart to illustrate how one arm 24 is identical to the other arm 25 and, by arranging their positions in preparation for interlocking, the two identical arms 24, 25 thereafter form a cooperating pair. Their similarity adds to the economy of the fastener by having all arms manufactured identically.

Figure 6:
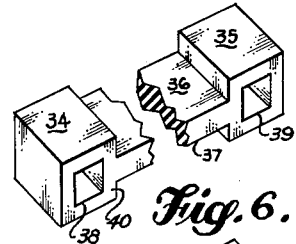
FIGURE 6 illustrates, in perspective, with portions removed, one embodiment of the expandable, elongated body wherein the central portion has an extruded rectangular cross section.
Figure 7:
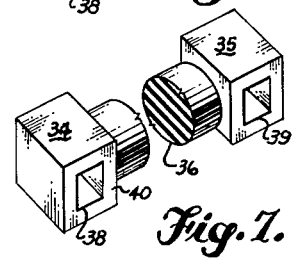
FIGURE 7 shows, in perspective, with portions removed another embodiment of the expandable, elongated body wherein the central portion has a molded circular cross section.

In FIGURES 6 and 7, the receiving structures 34, 35 and portions of two embodiments of elongated and expandable body structures are illustrated. They are, preferably either molded or extruded. The receiving structure 34, 35 at all times has a cross section which closely accommodates the inserted interlocked hinge-like hook legs 26, 27 of the arms 24, 25.

Under any exclusive loadings of fasteners 22, the overlapping piercing points 32, 33 formed on their arc of curvature will separate without interference of one 32 with the other 33. However, such loading will have to be necessarily an extreme one, because during normal usage the fastener 22 retains the fastened materials 23 in place reliably and comfortably. At all times under normal loads, the penetrating hooks 30, 31 are forced together by the combined forces of the resistive distortion forces of the receiving structure 34, 35 and the tension forces that are initially established and subsequently increased in the expanded elongated resilient body portion 36.

In operating the fastener from the "at rest" position, advancing the receiving hook ends 30, 31 of the paired arms 24, 25 to material 23, the arms conveniently pivot apart because the receiving structure 34, 35 having rectangular recesses 43, 44 in contrast to a cylindrical recess in the fastener noted in Serial No. 114,859 requires less distortional force to open the overlapping hooks 30, 31 for subsequent penetration. As a matter of convenience, the user of the fastener 22 will find the receiving structure 34, 35 to be a convenient gripping place when applying and removing the fastener 22 from materials 23. However, it is to be noted in contrast to the fastener shown in application, Serial No. 114,859, the user does not pre-pivot the arms, but merely directs the paired arms to the material and thereby separates the arms so their piercing hooks will enter the material as the body expanding forces are reversed.

Figure 2:
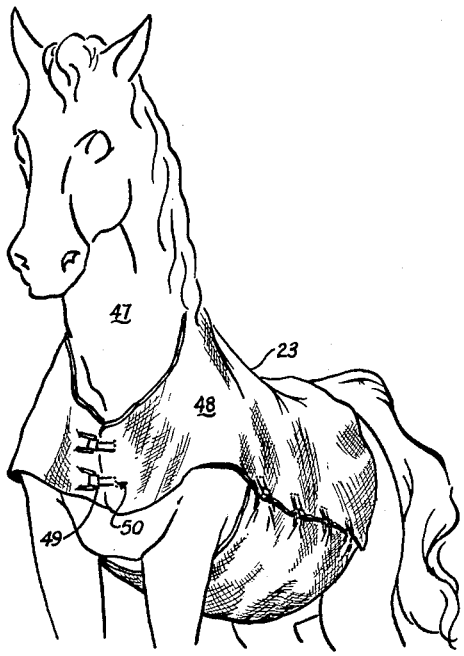
FIGURE 2 illustrates a blanket held in place, using another embodiment of the fastener, on an animal, such as a horse.

Although in most instances, the fastener hooked configuration will probably be used as a separate unit in itself requiring pairs of pivoting arms at each end of an elongated expandable resilient body there may be nevertheless situations in which one end 50 of such body of another embodiment of the fastener 49 will be permanently fastened by stitching, riveting or bonding to a segment of material to be joined about a person or animal. Such an application is indicated in FIGURE 2 of fasteners 49 used in junction with a large horse 47 blanket 48. Essentially, the same features and aspects of the invention are important. However, the resiliency of the body is only supplementing the holding power of the hooks in one end and the stitching, riveting or bonding 50 is relied upon, solely, to make the permanent connection to the material or blanket 48 at the opposite end of the body 36.

The same features and aspects of the invention carry over to another interesting use of a fastener embodiment such as shown in FIGURE 4 with, however, the pivoting arms at one end being removed. Thereafter the wire of a clothes hanger is threaded through the receiving structure and the fastener hangs down with its remaining set of pivoting arms ready to support a garment, such as a ladies' slip or skirt. Generally two or more fasteners of this configuration are used in this manner suspended from a clothes hanger.

Somewhat the same result is obtained if the fastener embodiment shown in FIGURE 4 is used directly in conjunction with the clothes hanger, one set of pivoting arms being used to surround the hanger wire and thereby attach the fastener to the clothes hanger leaving the other set of pivoting arms available to support various garments.

I claim:

1. A fastener for piercing and holding together materials, comprising an elongated, expandable, resilient connector having at each end a formed resilient distortable receiving structure, and paired arms, each having a piercing hook at the outer end, said hooks adapted to overlap when the fastener is not in use, each of the paired arms having a hinge-like hook offset leg with a bent over tab at its inner end complementarily fitting in the receiving structure, the tabs of the hinge-like hook offset legs of each pair of arms being confined to each other centrally of the receiving structure, whereby when the hooks of each pair are separated the resilient receiving structure is distorted and when the elongated resilient connector is stretched and the hooks at each end thereof are secured to material, both a resistive distortive force of the distortable receiving structure and a tensile force of the stretched resilient connector combine to maintain the hooks in a holding position.

2. A fastener for piercing and holding together materials, as claimed in claim 1, having paired arms each having a piercing hook at the outer end comprising initially a rounded portion, thereafter a reversed curved portion containing an inner and adjacent recess and a continuing curved portion terminating in a sharp point formed to fit the inner and adjacent recess of the opposite-like-piercing hook of the paired arm.

3. A fastener piercing and holding toegther materials, as claimed in claim 1, having distortable receiving structure at the ends of the elongated, expandable, resilient connector comprising uniform thickness, multiple sided structure defining a rectangular cross-sectioned recess to accommodate the offset legs and bent over tabs of the hinge-like hook offset legs in a close fitting relationship until the paired arms are moved apart rotating the hinge-like hook offset legs into engagement with the then distorted resilient receiving structure.

4. A fastener for reasonably permanent installation at its one end to material and for temporary attachment at its other end to other portions of material comprising an elongated, expandable, resilient connector having at one end a reasonably flat section for permanent installation to material and at its other end a formed resilient distortable receiving structure, and paired arms, each having a piercing hook at the outer end, the hooks adapted to overlap when the fastener is not in use, each of the paired arms having a hinge-like hook offset leg with a bent over tab at its inner end, complementarily fitting in the receiving structure, the tabs of the hinge-like hook offset legs of each pair of arms being confined to each other centrally of the receiving structure whereby when the hooks of each pair are separated the resilient receiving structure is distorted and when the elongated resilient connector is stretched and the hooks are secured to material after the flat section is permanently installed, both a resistive, distortive force of the distortable receiving structure and a tensile force of the stretched resilient connector combine to maintain the hooks in a holding position.

5. A fastener, as claimed in claim 4, having paired arms each having a piercing hook at the outer end comprising initially a rounded portion, thereafter a reversed curved portion containing an inner and adjacent recess and a continuing curved portion terminating in a sharp point formed to fit the inner and adjacent recess of the opposite-like-piercing hook of the paired arm.

6. A fastener, as claimed in claim 4, having distortable receiving structure at one end of the elongated, expandable, resilient connector comprising uniform thickness multiple sided structure defining a rectangular cross-sectioned recess to accommodate the offset legs and bent over tabs of the hinge-like hook offset legs in a close fitting relationship until the paired arms are moved apart rotating the hinge-like hook offset legs into engagement with the then distorted resilient receiving structure.

7. A fastener for piercing and holding together materials, as claimed in claim 4, having paired arms, each arm comprising: a central shank portion, a piercing hook at its outer end and a hinge-like hook offset leg at its inner end arranged to interfit with the hinge-like hook offset leg of its paired arms originally positioning the central shanks of the paired arms in a substantially parallel relationship.

8. A fastener for piercing and holding together materials, as claimed in claim 7, having formed resilient distortable receiving structure of sufficient width to receive substantially all of the offset legs and their tabs and thereby substantially abut the central shanks maintaining the shanks in a substantially parallel arrangement before the fastener is used.

9. A fastener for piercing and holding together materials, as claimed in claim 5, the reversed curved portions of the piercing hooks being oppositely positioned, to form a material receiving entrance and to move apart radially upon the continued initial insertion of the material and thereafter radially return to penetrate the materials.

10. A fastener for piercing and holding materials together, comprising an elongated, expandable, resilient connector having at one end an anchoring means for attachment to materials and having at the other end a formed resilient distortable structure defining a transverse passage and paired arms, each having a piercing hook at the outer end, the hooks adapted to overlap when the fastener is not in use, each of the paired arms having a hinge-like hook offset leg with a bent over tab at its inner end firmly positioned substantially within the transverse passage of the resilient distortable end structure, the tabs of the hinge-like hook offset legs of each pair of arms being confined to each other centrally of the receiving structure, whereby when the hooks of each pair are separated the resilient structure having the transverse passage is distorted and when the elongated resilient connector is stretched and the hooks are secured to material, both a resistive distortive force of the distortable end structure defining the transverse passage and a tensile force of the stretched resilient connector combine to maintain the hooks in a holding position.

11. A fastener for supporting piercable materials from hangers comprising an elongated, expandable, resilient connector having at one end a formed transverse passage to accommodate structure of the hanger and having at the other end a formed resilient distortable structure defining a transverse passage and paired arms, each having a piercing hook at the outer end, the hooks adapted to overlap when the fastener is not in use, each of the paired arms having a hinge-like hook offset leg with a bent over tab at its inner end firmly positioned substantially within the transverse passage of the resilient distortable end structure, the tabs of the hinge-like hook offset legs of each pair of arms being confined to each other centrally of the receiving structure, whereby when the hooks of each pair are separated the resilient structure having the transverse passage is distorted and when the elongated resilient connector is stretched and the hooks are secured to material, both a resistive distortive force of the distortable end structure defining the transverse passage and a tensile force of the stretched resilient connector combine to maintain the hooks in a holding position.

References Cited in the file of this patent
UNITED STATES PATENTS 2,616,393     Rebarchek     Nov. 4, 1952
2,637,329     Reiter     May 5, 1953